Sept. 9, 1952 R. J. S. PIGOTT 2,610,066
CHUCK
Filed May 22, 1950
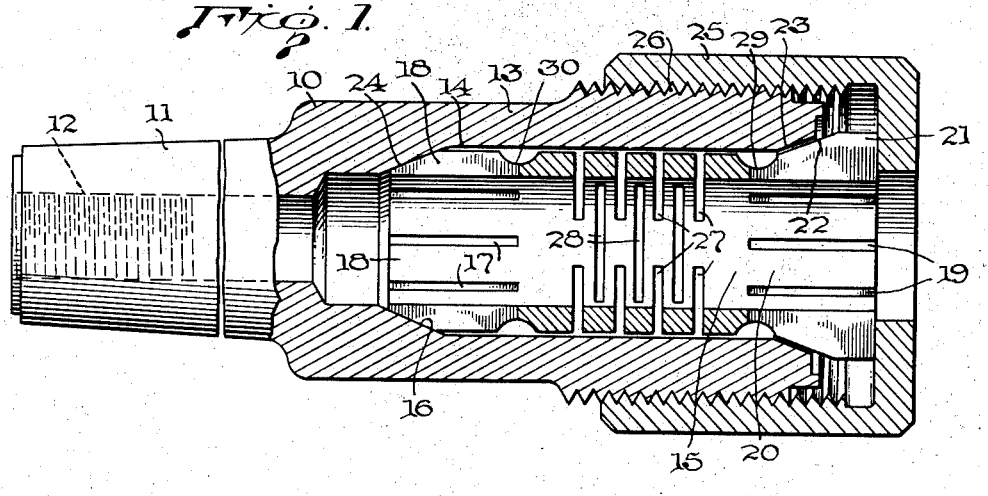
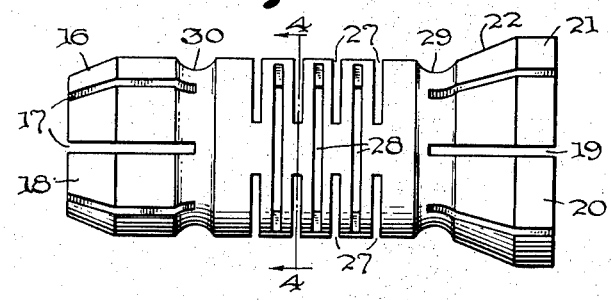
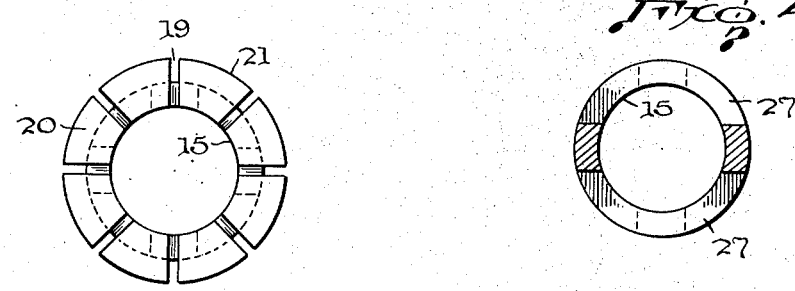
INVENTOR.
REGINALD J. S. PIGOTT
BY A. M. Houghton
HIS ATTORNEY Patented Sept. 9, 1952

2,610,066

UNITED STATES PATENT OFFICE 2,610,066

CHUCK

Reginald J. S. Pigott, Pittsburgh, Pa., assignor to Gulf Research & Development Company, Pittsburgh, Pa., a corporation of Delaware Application May 22, 1950, Serial No. 163,496

5 Claims. (Cl. 279—51)

This invention relates to collet chucks, and more particularly to a work holding collet having jaws at each end and an intermediate portion formed with staggered lateral slots extending transversely of its bore, thereby constituting cantilever springs which afford such resiliency as will permit the collet to be axially compressed and the jaws uniformly contracted in centering and gripping the work, by contact of the end portions of the collet with surrounding tapered seats within an enclosing body member.

The invention is an improvement upon my prior Patents Nos. 2,282,674 and 2,282,676, issued May 12, 1942.

Collet chucks are used on lathes and other metal-working machinery for holding round bars and other round work pieces with greater accuracy of position than jaw chucks. The conventional collet chuck includes a one-piece tubular member, split at the end to form springy jaws, and means for compressing the jaws on the bar, rod, etc., to be machined; that is, the "work." If the work is just the right diameter to fit the chuck, centering is accurate and the grip is firm. But if the work is more than a trifle undersize or if its diameter is not uniform along its length, centering is imperfect and wobbling is permitted, as the work is held at only one point (or more correctly at one narrow annular area) along its length and the inner end is free to move radially with respect to the chuck. Prior to my aforesaid patents attempts had been made to provide collet chucks which would grip the work at two spaced points along its length, but most of such chucks failed to provide really accurate centering and firm holding for distinctly off-size work, and moreover they were unduly complicated and delicate in construction. In some cases centering depended upon the maintenance of two or more separate parts, threadedly or otherwise fitted together in detachable relation.

In my aforesaid patents, as in the present construction, the chuck collet is provided with jaws at both ends for gripping the work at spaced points and its intermediate portion is formed as a spring which permits the collet to be compressed in axial direction. The enclosing body member of the chuck is tapered at two places and the collet has a tapered inner end engaging one such taper of the body and a spaced tapered portion adjacent its other end slightly spaced from the other taper of the body. Means is provided for axially compressing the collet which upon manipulation urges the collet against the taper of the body at the inner end to compress the jaws against the inserted end of the work, and thereupon compresses its intermediate spring portion to a degree permitting engagement between the spaced taper on the collet with the corresponding taper of the body, thereby to compress or contract the spaced jaws at the other end of the collet to grip the work. Whereas, in the aforesaid patented constructions the spring section of the collet was formed by a helical slot cut in its intermediate portion, the present invention provides multiple, flat cantilever springs formed by staggered lateral saw cuts which, aside from being much cheaper to construct, has the advantage that the symmetrical disposition of the four cantilever springs at each pair of slots keeps the collet entirely balanced in respect to thrust so there is no tendency to distort or get out of alignment. Further, by spacing the slots at different distances apart, the inherent stiffness of the collet against the spring compression can be altered. This is especially advantageous since it is desirable for production economy to employ collet bodies of the same size notwithstanding that their bores are different for different size work. Thus, if the same collet body as is ordinarily formed with a half inch diameter bore were, instead, formed with an eight inch bore the greater thickness of metal in its wall would make the spring stiffer in axial compression. In accordance with the present invention the spring stiffness may be readily varied by forming fewer or more cuts in the collet body and varying the spacing of the cuts as required. As a consequence, collets of the same external size may be interchangeably employed for different sizes of work without replacement or change in the enclosing chuck body. In cases where there is a substantial thickness of metal in the collet wall, annular grooves may be formed at the bases of the gripping jaws at each end to render them more flexible.

The foregoing advantages of the instant construction comprise the objects of the present invention as achieved by providing the collet body with lateral slots which produce multiple, flat cantilever springs in a portion intermediate its ends. Other objects and advantages will appear from the following description and accompanying drawings in which Figure 1 is a view in central vertical section with some parts in elevation of the chuck assembly;

Figure 2 is a side view of the collet;

Figure 3 is an end view of the collet taken from the right of Figure 2; and

Figure 4 is a cross sectional view along line 4—4 of Figure 2.

Referring to the drawing, Figure 1 shows a collet chuck including a chuck body 10 having a conventional tubular tapered shank portion 11 threaded at the inner end at 12, and comprising a head 13 bored at 14 for reception of an inserted collet of unitary construction. The collet has a uniform bore 15 and an inner end tapered at 16, which is slotted radially at a plurality of points 17 about its circumference, to form jaws 18, so that the jaws can be compressed or contracted slightly for accommodating a work piece (not shown) of diameter slightly smaller than that of the bore. The jaw portion is joined through a midsection to the outer end slotted at 19 to form jaws 20 and having an enlarged head 21 tapered at 22 with a taper in the same direction and advantageously of the same included angle as the taper 16. The insert is long enough so that taper 22, in the disengaged position of the chuck, is slightly spaced from a correspondingly beveled seat 23 in head 13 when taper 16 is seated on its corresponding conical seat 24 in the head. A nut 25 engaging threads 26 on head 13 is provided for tightening the chuck. The midsection of the collet is formed with pairs of opposed slots or saw cuts 27, 28, each pair being offset 90° with respect to those adjacent to it on each side; in other words the slots are staggered to provide multiple, flat cantilever springs in the midportion of the collet. The outer diameter of the collet is slightly smaller than the bore 14 of the chuck body, as shown, to avoid binding.

The taper of the jaw ends and seats is advantageously about 22½° as shown, making the total angle included between opposite walls of each cone about 45°.

In operation, work (not shown) is inserted in the chuck and the nut is tightened. Since the body of the collet is slightly longer than the distance between taper seats 23 and 24, as the nut is pulled down with work inserted in the collet, the pressure seats the inner taper first, centering the work at the inner end. The spring then compresses and applies only a spring loading to this rear taper. Finally, the compression of the spring allows the outer taper to engage its seat with uniform pressure throughout its circumference and further tightening of the nut then contracts the outer split jaws, firmly gripping and centering the work at the outer end. The symmetrical disposition of the cantilever springs at each pair of slots keeps the collet entirely balanced in respect to thrust so there is no tendency to distort or get out of alignment. When the axial pressure is relieved the jaws of the collet readily disengage from the seats. The driving grip is furnished by the contraction of the outer conical jaw portion which can be made as solid as necessary to drive the work properly, but where the thickness of the collet body is sufficient to cause undesirable stiffness of the jaws annular grooves may be formed at the bases of the jaws as at 29 and 30 to increase their flexibility. And where the bore of the collet is of reduced diameter, leaving a greater thickness of metal in the body portion, the outer diameter may be cut down since there are no fits required except on the two cones. The interior may also be hollowed out to an increased diameter, leaving the jaws at the ends of small hole size, but although this construction is feasible for reducing stiffness of the spring it raises cost.

From the foregoing it will be apparent that the relative proportions of the several portions of the collet may be varied at will to meet particular requirements and the desired springiness under axial compression may be readily achieved by providing more or fewer lateral cuts in the body portion, all of which may be achieved at moderate production cost.

What I claim as my invention is:

1. In a collet chuck having a tubular body member formed with spaced conical seats within its bore, a unitary work-holding member in the bore, having end jaw portions tapered to fit said seats, and an intermediate portion formed with a series of lateral slots in planes normal to the axis of said work-holding member and defining mated, flat cantilever springs which permit axial compression of said work-holding member, and means for compressing said work-holding member.

2. In a collet chuck having a tubular body member formed with spaced conical seats within its bore, a unitary work-holding member in the bore, having end jaw portions tapered to fit said seats, and an intermediate portion formed with a series of pairs of lateral slots, each such pair of slots being offset ninety degrees circumferentially from those adjacent thereto, thereby to define multiple cantilever springs which permit axial compression of said work-holding member, and means for compressing said work-holding member.

3. A collet comprising a tubular element slotted longitudinally at each end to define a plurality of jaws adjacent each end, and an intermediate portion formed with spaced pairs of lateral slots, the slots of alternate pairs being circumferentially staggered with respect to those adjacent thereto, thereby to define a multiplicity of flat, cantilever springs which render the collet axially compressible.

4. A collet comprising a tubular element slotted longitudinally at each end to define a plurality of jaws adjacent each end, an annular groove in the external surface of said collet at the bases of the jaws at each end to increase the flexibility of the jaws, the portion intermediate said jaws at the ends being formed with staggered pairs of parallel slots which are alternately arranged in planes normal to the axis of said tubular element and transversely thereof to define a cantilever spring portion, whereby to render the collet axially compressible.

5. A collet comprising a tubular element slotted longitudinally at each end to define a plurality of jaws adjacent each end, the portion intermediate the jaws at each end being formed throughout a portion of its length with a series of pairs of lateral slots extending through the wall of the collet, the slots of each such pair being in the same lateral plane, and each pair of slots being offset ninety degrees circumferentially with respect to adjacent pairs, thereby to define multiple cantilever springs rendering the collet axially compressible.

REGINALD J. S. PIGOTT.

REFERENCES CITED

The following references are of record in the file of this patent:

UNITED STATES PATENTS

| Number | Name | Date |
|---|---|---|
| 287,761 | Gilbert | Oct. 30, 1883 |
| 1,557,923 | Carroll | Oct. 20, 1925 |
| 1,912,201 | Huck | May 20, 1933 |
| 2,193,890 | Strobl | Mar. 19, 1940 |
| 2,282,674 | Pigott | May 12, 1942 |
| 2,282,676 | Pigott | May 12, 1942 |